United States Patent
Oladepo (10) Patent No.: US 11,766,720 B2
(45) Date of Patent: Sep. 26, 2023

(54) METHOD OF MAKING SILVER NANOPARTICLES

(71) Applicant: KING FAHD UNIVERSITY OF PETROLEUM AND MINERALS, Dhahran (SA)

(72) Inventor: Sulayman Adeyemi Oladepo, Leduc County (CA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 11 days.

(21) Appl. No.: 17/677,395

(22) Filed: Feb. 22, 2022

(65) Prior Publication Data

US 2023/0114653 A1    Apr. 13, 2023

Related U.S. Application Data (60) Provisional application No. 63/253,338, filed on Oct. 7, 2021.

(51) Int. Cl.
*B22F 9/24* (2006.01)
*G01N 21/78* (2006.01)
(Continued)

(52) U.S. Cl.
CPC ............... *B22F 9/24* (2013.01); *G01N 21/78* (2013.01); *B22F 2301/255* (2013.01);
(Continued)

(58) Field of Classification Search
CPC ............ B22F 1/054–1/056; B22F 9/24; B22F 2301/255; B22F 2304/05; G01N 21/78; G01N 2015/0038; G01N 2015/0693
See application file for complete search history.

(56) References Cited

U.S. PATENT DOCUMENTS 9,491,947 B1    11/2016    Awad et al.
9,719,975 B1    8/2017    Basheer et al.

FOREIGN PATENT DOCUMENTS

| CN | 110142416 A | * | 8/2019 | ............... B22F 9/24 |
| CN | 111069623 A | * | 4/2020 | |
| CN | 111069623 A | | 4/2020 | |

OTHER PUBLICATIONS

Aminu (Aminu, Abdulmalik, and Sulayman A. Oladepo. "Fast orange peel-mediated synthesis of silver nanoparticles and use as visual colorimetric sensor in the selective detection of mercury (II) ions." Arabian Journal for Science and Engineering 46 (2021): 5477-5487) (Year: 2020).*

(Continued)

*Primary Examiner* — Sally A Merkling
*Assistant Examiner* — Sean P. O'Keefe
(74) *Attorney, Agent, or Firm* — Oblon, McClelland, Maier & Neustadt, L.L.P.

(57) ABSTRACT

A method of synthesis of silver nanoparticles (AgNP's) using an orange peel extract is described. The method includes preparing an orange peel extract by cutting a portion of an orange peel into smaller pieces and washing the cut orange peel pieces with de-ionized water to form a washed orange peel. The method further includes boiling the washed orange peel in de-ionized water for at least 3 minutes to form an extract solution and filtering the extract solution from the orange peel to obtain the orange peel extract. The method further includes forming a synthesis mixture of at least one silver salt and the orange peel extract and reacting the silver salt and the orange peel extract to form the silver nanoparticles within 1 minute. The silver nanoparticles find application in detection of mercury ions in an aqueous solution.

13 Claims, 8 Drawing Sheets

(51) Int. Cl.
  *G01N 15/06* (2006.01)
  *G01N 15/00* (2006.01)
(52) U.S. Cl.
  CPC .. *B22F 2304/05* (2013.01); *G01N 2015/0038* (2013.01); *G01N 2015/0693* (2013.01)

(56) References Cited

OTHER PUBLICATIONS

De Barros, Caio Henrique Nasi, et al. "Bio-based synthesis of silver nanoparticles from orange waste: effects of distinct biomolecule coatings on size, morphology, and antimicrobial activity." Nanotechnology, science and applications (2018): 1-14 (Year: 2018).*

Shabana Bhagat, et al., "Trace LEvel Colorimetric $Hg^{2+}$ Sensor Driven by *Citrus japonica* Leaf Extract Derived Silver Nanoparticles: Green Sunthesis And Application", Journal of Cluster Science, Jun. 16, 2021, 19 pages (Abstract only).

Eman Alzahrani, "Colorimetric Detection Based on Localized Surface Plasmon Resonance Optical Characteristics for Sensing of Mercury Using Green-Synthesized Silver Nanoparticles", Journal of Analytical Methods in Chemistry, vol. 2020, Article ID: 6026312, Jan. 11, 2020, 14 pages.

Margarita I. Skiba, et al., "Synthesis of Silver Nanoparticles Using Orange Peel Extract Prepared by Plasmochemical Extraction Method and Degradation of Methylene Blue under Solar Irradiation", Advances in Materials Science and Engineering, vol. 2019, Article ID: 8306015, Oct. 9, 2019, 8 pages.

Vijay Kumar, et al., "Green synthesis of silver nanoparticle for the selective and sensitive colorimetric detection of mercury (II) ion", Journal of Photochemistry and Photobioloby B: Biology, vol. 168, Mar. 2017, pp. 67-77 (Abstract only).

Khalil Farhadi, et al., "Highly selective $Hg^{2+}$ colorimetric sensor using green synthesized and unmodified silver nanoparticles", Sensors and Actuators B: Chemical, vol. 161, 2012, pp. 880-885.

Shilpa Bothra, et al., "Functionalized Silver Nanoparticles as Chemosensor for pH, $Hg^{2+}$ and $Fe^{3+}$ in Aqueous Medium", Sensors and Acutators B: Chemical, vol. 188, Nov. 2013, 27 pages.

Salawu Omobayo Adio, et al., "Biogenic synthesis of silver nanoparticles; study of the effect of physicochemical parameters and application as nanosensor in the colorimetric detection of $Hg^{2+}$ in water", International Journal of Environmental Analytical Chemistry, Jun. 28, 2016, 13 pages.

* cited by examiner

METHOD OF MAKING SILVER NANOPARTICLES

CROSS-REFERENCE TO RELATED APPLICATION

The present application claims benefit of priority to U.S. Provisional Application No. 63/253,338, filed Oct. 7, 2021, incorporated herein by reference in its entirety.

STATEMENT OF PRIOR DISCLOSURE BY THE INVENTOR

Aspects of the present disclosure are described in Aminu, et. al., "Fast Orange Peel-Mediated Synthesis of Silver Nanoparticles and Use as Visual Colorimetric Sensor in the Selective Detection of Mercury (II) Ions", 20 Oct. 2020; Arabian Journal for Science and Engineering; 46; 5477. incorporated herein by reference in its entirety.

BACKGROUND

Technical Field

The present disclosure is directed to a method of making nanoparticles, and particularly, to a method of making silver nanoparticles and their use in detection of mercury ions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Silver nanoparticles (AgNPs), a class of noble metal nanoparticles, attract attention due to their dynamic properties and vast areas of applications. They possess the capability to strongly absorb electromagnetic waves in the visible region, and possess favorable optical and electrochemical properties, with excellent biological compatibility and a high extinction coefficient. The incorporation of silver nanomaterials into sensing systems is advantageous in the area of molecular sensing, as they offer better stability, enhanced sensitivity, and improved cost-effectiveness.

Conventional methods of synthesizing silver nanoparticles are energy and capital intensive, as they employ toxic chemicals, non-polar solvents, and involve complex and multi-step procedures, which preclude their use in clinical and biomedical applications. Therefore, there exists a need for development of fast, clean, biocompatible, and benign methods to synthesize silver nanoparticles. In addition, sustainability awareness and concerns also contribute to the need for simple, reliable, and eco-friendly (green) methods of synthesizing the silver nanoparticles.

SUMMARY

In an exemplary embodiment, a method of making the silver nanoparticles (AgNPs) is described. The method of making the silver nanoparticles includes preparing an orange peel extract by cutting a portion of an orange peel into pieces having a surface area of 0.01-0.4 square centimeter ($cm^2$); and washing the cut orange peel pieces with de-ionized water to form a washed orange peel. The method further includes forming a mixture of 5-20 weight % (wt. %) washed orange peel and 80-95 wt. % de-ionized water based on the total weight of the washed orange peel and deionized water, boiling the mixture in water for at least 3 minutes (mins) to form an extract solution; and filtering the extract solution from the orange peel to obtain the orange peel extract. The method further includes forming a synthesis mixture of at least one silver salt and the orange peel extract, where the silver salt is at a concentration of 0.01-0.03 molarity (M) in solution and the orange peel extract is present in a 1:5-10 volume ratio of the orange peel extract to the silver salt solution. Furthermore, the method includes reacting the silver salt and the orange peel extract to form the silver nanoparticles by heating the synthesis mixture to 40-60 degree centigrade (° C.) and adjusting the mixture potential of hydrogen (pH) to 8-10 while stirring to thereby form a colloidal solution of silver nanoparticles in less than 1 minute.

In some embodiments, the silver nanoparticles formation is confirmed by the appearance of an absorption band from 410 to 440 nanometers (nm) in the ultraviolet-visible (UV-vis) spectrum.

In some embodiments, the silver salt selected from the group consisting of a silver halide, a silver sulfate, and a silver nitrate and the orange peel extract is from a *Citrus sinensis* (orange) species.

In some embodiments, the silver nanoparticles are amorphous; and the silver nanoparticles have a mean particle size of 25-75 nm.

In another embodiment, a method of detecting mercury ions in an aqueous solution is described. The method includes cutting a portion of the orange peel into pieces with a surface area of 0.01-0.4 $cm^2$; and washing the cut orange peel pieces with de-ionized water to form the washed orange peel. The method further includes forming the mixture of 5-20 wt. % washed orange peel and 80-95 wt. % de-ionized water based on the total weight of the washed orange peel and deionized water, boiling the mixture in water for at least 3 mins to form the extract solution; and filtering the extract solution from the orange peel to obtain the orange peel extract. The method further includes forming the synthesis mixture of at least one silver salt and the orange peel extract, where the silver salt is at a concentration of 0.01-0.03 M in solution and the orange peel extract is present in a 1:5-10 volume ratio of the orange peel extract to the silver salt solution. In some embodiments, the silver salt is selected from the group consisting of the silver halide, the silver sulfate, and the silver nitrate; and the orange peel extract is from the *Citrus sinensis* (orange) species. Furthermore, the method includes reacting the silver salt and the orange peel extract to form the silver nanoparticles by heating the synthesis mixture to 40-60° C. and adjusting the mixture pH to 8-10 while stirring to form a colloidal solution of the silver nanoparticles in less than 1 minute. In some embodiments, the silver nanoparticles formation is confirmed by the appearance of an absorption band from 410 to 440 nm in the UV-vis spectrum. In some embodiments, the silver nanoparticles are amorphous; and the silver nanoparticles have a mean particle size of 25-75 nm. In some embodiments, the method further includes centrifuging the colloidal solution of silver nanoparticles and filtering off excess solution to form a wet powder and drying the wet powder at a temperature less than 150° C. to form a dry powder. Furthermore, the method includes mixing with the dry powder into the aqueous solution and detecting a color change on mixing indicating the presence of $Hg^{2+}$ in the aqueous solution. In some embodiments, the aqueous solution further comprises at least one metal cation selected from the group consisting of $Ca^{2+}$, $Mg^{2+}$, $Al^{3+}$, $Ni^{2+}$, $Cd^{2+}$, and $Na^+$; and the color change occurs selectively in the presence of $Hg^{2+}$. In some embodiments, the method includes quantifying the color change to determine the concentration of $Hg^{2+}$ in the aqueous solution. In some embodiments, the color change is measured by the disappearance of the absorption band from 400 to 600 nm in the UV-vis spectrum; and the degree of the color change linearly correlates with the concentration of $Hg^{2+}$ in the aqueous solution. Some embodiments include the method wherein the $Hg^{2+}$ detection limit is 0.25 parts per million (ppm).

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Embodiments of the present disclosure are directed to a green synthesis of silver nanoparticles (AgNPs) using an orange peel extract. The orange peel is the protective layer of an orange fruit which is made up of an albedo (inner layer) and a flavedo (outer layer). The peel biomass possesses high amounts of natural antioxidants like flavonoids, resins, monoterpenes, phenols, carotenoids, and saponins, making it highly suitable for medicinal and chemical uses, one of which is its use as a reducing agent in green synthesis of AgNPs. Antioxidants typically contain hydroxyl groups which aid in the reduction process. A commonly found antioxidant in orange peels is vitamin C, or ascorbic acid, which employs two hydroxyl groups attached to its ring structure to aid in the reduction of other compounds by giving away two electrons, thereby leaving two carbonyl groups on the ring structure. In the case of the present disclosure, the electrons are used to reduce $Ag^+$, forming $Ag^0$. The use of the orange peel extract as a reducing agent makes the process environmentally friendly, and in addition, overcomes the drawbacks associated with use of toxic chemicals, and hazardous solvents, as used in the conventional methods. The AgNPs of the present disclosure were synthesized in a one-pot reaction, thereby overcoming the drawbacks associated with multi-step reactions, such as poor yields. Also, the silver nanoparticles prepared by the process of the present disclosure were formed in less than 1 minute; thereby saving substantial amounts of reaction time and its associated costs. The AgNPs when used in nanosensor can be used for detection of mercury (II) ions in water, with excellent selectivity and sensitivity.

Figure 1A:
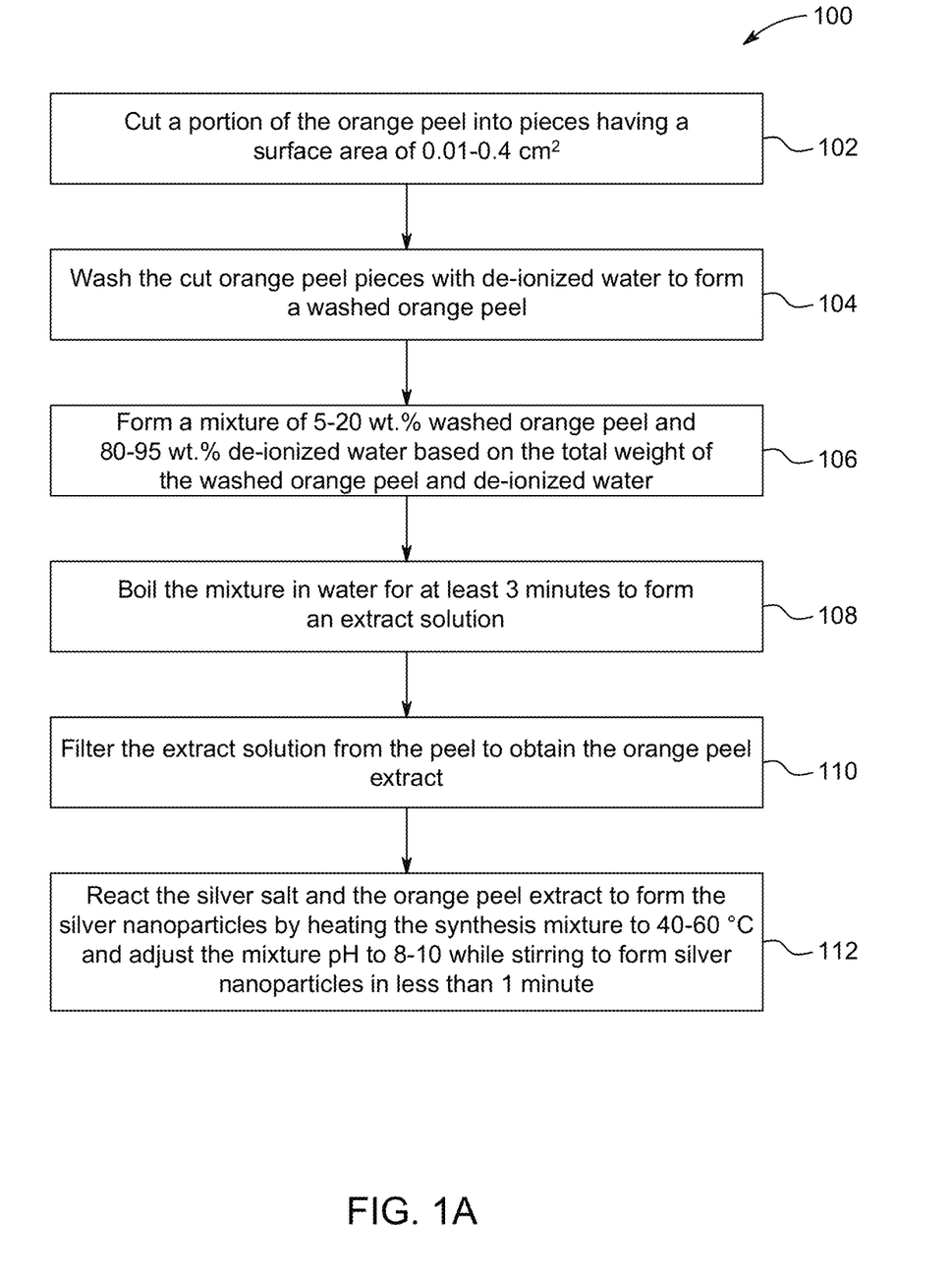
FIG. 1A is a schematic flow diagram of a method of making silver nanoparticles (AgNPs), according to certain embodiments.

FIG. 1A illustrates a method 100 for making silver nanoparticles. The order in which the method 100 is described is not intended to be construed as a limitation, and any number of the described method steps can be combined in any order to implement the method 100.

Additionally, individual steps may be removed or skipped from the method 100 without departing from the spirit and scope of the present disclosure.

At step 102, the method 100 includes cutting a portion of a fresh orange peel into pieces having a surface area of 0.01-0.4 cm² preferably 0.1-0.36 cm², 0.15-0.30 cm², or 0.2-0.25 cm². The term fresh refers to oranges that have been separated from an orange tree for no longer than one month. In an embodiment the pieces can be, but are not limited to, circles, triangles, rectangles, squares, or combinations thereof. In an embodiment, the orange peel can be cut into pieces manually, or with a cutting equipment such as a blade, knife, or cutting scissors.

At step 104, the method 100 includes washing the cut orange peel pieces with de-ionized water to form a washed orange peel. Washing is done to remove any impurities present on surface of the orange peel.

At step 106, the method 100 includes forming a mixture of 5-20 wt. % washed orange peel and 80-95 wt. % de-ionized water based on the total weight of the washed orange peel and de-ionized water, preferably 7-17 wt. % washed orange peel and 83-93 wt. % de-ionized water, or 10-15 wt. % washed orange peel and 85-90 wt. % de-ionized water.

At step 108, the method 100 includes boiling the mixture in water for at least 3 minutes, preferably 3-10 minutes, or 5-7 minutes to form an extract solution. The mixture can be boiled in water to a temperature range of 60-100° C., preferably 75-90° C., or 80-85° C. to extract the antioxidants, that could act as reducing agents, naturally present within the orange peel. The orange peel extract can be prepared from *Citrus aurantium, Citrus sinensis, Citrus macrocarpa, Citrus medica, Citrus aurantifolia, Citrus sinensis,* or any other *citrus* species. In an embodiment, the orange peel extract was obtained from *Citrus sinensis*. At step 110, the method 100 includes filtering the extract solution from the peel to obtain the orange peel extract.

A preferred embodiment of the invention includes a step of derivatizing the orange peel extract before use as a reducing agent in the reaction with the silver salt. The extract mixture can be reacted with an oxidizing agent such as a halogen, potassium nitrate, nitric acid, a hypochlorite, a perchlorate and/or a permanganate, preferably one or more of potassium permanganate and ozone, to carboxylate or otherwise derivatize reducing agents such as flavonoids and citric acid present in the orange peel extract. The addition of carboxylate groups and/or oxidatively added moieties to the reducing agent aids during reaction of the components of the orange peel extract with silver. The carboxylate groups ensure easy contact and solubilization of silver ions and also help stabilize soluble silver intermediates formed during reduction. Carboxylic groups may complex with silver as Lewis bases. These complexes do not necessarily form ionic or covalent bonds but nonetheless help to stabilize oxidative intermediates and/or ions that may be present during the reduction reaction. Preferably the reaction is carried out by mixing the extract with potassium permanganate dissolved in a basic solution, e.g., 1M NaOH, and heating to a temperature of up to 60° C. for 3 hours. Reaction conditions are preferably sufficient to completely deplete the compatibilization agent from the extract mixture, leaving only the compatibilized reducing agent and a byproduct that is benign to the reducing reaction.

The orange peel extract was further combined to form a synthesis mixture of at least one silver salt and the orange peel extract, where the silver salt is at a concentration of 0.01-0.03 M, preferably 0.015-0.025 M, or 0.02-0.023 M in solution and the orange peel extract is present in a 1:5-10, preferably 1:6-9 or 1:7-8 volume ratio of orange peel extract to silver salt solution. At step 112, the method 100 includes reacting the silver salt and the orange peel extract to form the silver nanoparticles by heating the synthesis mixture to 40-60° C., preferably 45-55° C., or 48-52° C. and adjusting the mixture pH to 8-10, preferably 8.5-9.5, or 8.7-9.2 while stirring to form a colloidal solution of silver nanoparticles. In an embodiment, the silver salt is one of silver halide, a silver sulfate, and a silver nitrate. In an embodiment, the silver salt is silver nitrate. The pH may be adjusted with any base known in the art. In an embodiment, the base is an alkali metal hydroxide, or an alkaline earth metal hydroxide. In an embodiment, the silver nanoparticles are formed within 1 minute of the reaction. The formation of the silver nanoparticles is confirmed by the appearance of an absorption band from 400 to 600 nm, preferably 450-550 nm, or 400-450 nm in the UV-vis spectrum. In certain embodiments, the silver nanoparticles were amorphous; and had a mean particle size of 25-75 nm, preferably 30-60 nm, or 40-50 nm.

In some embodiments, the X-ray powder diffraction (XRD) pattern of the AgNPs obtained from X-ray diffraction analysis displays intense and sharp peaks indicating high crystallinity of the AgNPs and peaks arising from impurities were not detected. In an embodiment, the (111) peak is at 36-39° preferably, 36.5-38.5°, or 37-37.5°, the (200) peak is at 39-43° preferably, 40-42°, or 40.5-41°, the (220) peak is at 66-69° preferably, 66.5-68°, and 67-67.5°, and the (311) peak is at 78-81° preferably, 78.5-80°, or 79-79.5°. In an embodiment, based on the Fourier-transform infrared spectroscopy (FTIR), the surface of the AgNPs may be functionalized with the biomolecules found in the orange peel extract, containing $-NH_2$, carbonyl, and $-OH$ groups. A broad peak between 3000-4000 $cm^{-1}$ preferably 3200-3700 $cm^{-1}$ or 3350-3500 $cm^{-1}$ may be due to either O—H or N—H stretching vibrations from hydroxyl and amine groups of the extract constituents. In an embodiment, bands located at 2700-3000 $cm^{-1}$, preferably 2750-2950 $cm^{-1}$, or 2800-2900 $cm^{-1}$, may be C—H stretching vibrations of an antioxidant compound while the peak at 1750-1550 $cm^{-1}$, preferably 1700-1600 $cm^{-1}$, or 1625-1650 $cm^{-1}$, may be either amide C=O stretching (proteins) or aromatic C—C stretching (flavonoids). Peaks occurring at 1500-1350 $cm^{-1}$, preferably 1475-1375 $cm^{-1}$, or 1450-1400 $cm^{-1}$ may be an amide III band and are assigned to N—H bending and C—N stretching of protein structures present in the orange peel extract. The presence of these FTIR peaks elucidates the important role these functional groups play in the synthesis reaction and that protein molecules in the orange peel extract may be involved in the stabilization of AgNPs through amide bonds.

The colloidal solution of silver nanoparticles may be used as a nanosensor for detection of mercury ions. The synthesized nanoparticles were evaluated for their potential in detection of metal ions, particularly mercury.

Mercury is one of the most potent pollutants among all heavy metals, and it poses grave concern globally due to its high persistence in the environment especially in the oceans and seas. Contamination by mercury occurs because of natural phenomenon such as volcanic eruptions or from human activities that utilize or produce mercury compounds in mining, chemical, agricultural, and pharmaceutical industries. Conventional techniques used for detection of mercury ions such as cold vapor atomic absorption spectroscopy, flame photometry, inductively coupled plasma mass spectrometry, and solvent extraction followed by high-performance liquid chromatography (HPLC) suffer from drawbacks in that they are quite expensive, complex, and they require intricate sample preparation protocols. In the recent years, colorimetric sensors have been explored in the detection of $Hg^{2+}$ and they have been tagged as simple, rapid, sensitive, and highly selective. Conventionally used colorimetric techniques use expensive and complex sensor fabrication procedures. Therefore, there exists a need for simple, fast, and cheap colorimetric detection methods for mercury. In accordance, the present disclosure provides for a rapid, efficient, environmentally friendly method for detection of mercury ions using the silver nanoparticles, as prepared by the method 100. The use of the silver nanoparticles, as a sensor, also referred as a nanosensor, allows for rapid detection (in less than 3 minutes) of mercury ions, with high selectivity and sensitivity.

Figure 1B:
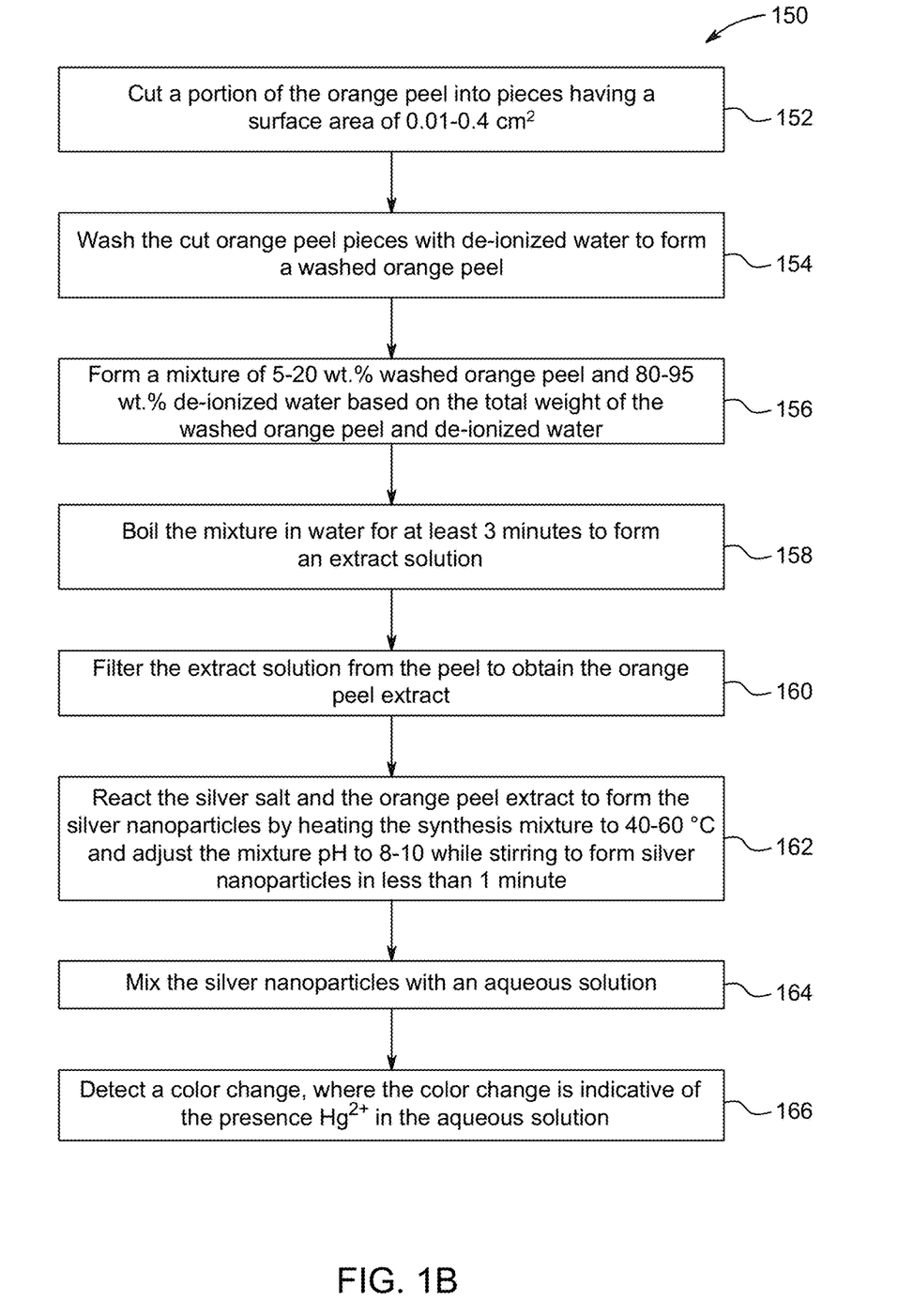
FIG. 1B is a schematic flow diagram of a method of for detecting mercury ions in an aqueous solution using the silver nanoparticles.

FIG. 1B illustrates a method 150 for detecting mercury ions in an aqueous solution using the silver nanoparticles as prepared by the method 100. The order in which the method 150 is described is not intended to be construed as a limitation, and any number of the described method steps can be combined in any order to implement the method 150. Additionally, individual steps may be removed or skipped from the method 150 without departing from the spirit and scope of the present disclosure. Steps 152-162, repeat the same steps as method 100, thereby producing AgNPs with the same properties as previously described.

At step 164, the method 150 includes mixing the silver nanoparticles with an aqueous solution. The aqueous solution may include metal ions such as, but not limited to $Ca^{2+}$, $Mg^{2+}$, $Al^{3+}$, $Ni^{2+}$, $Cd^{2+}$, and $Na^+$. In an embodiment, the metal ions may be $Li^+$, $Na^+$, $K^+$, $Be^{2+}$, $Mn^{2+}$, $Fe^{2+}$, $Co^{2+}$, $Ni^{2+}$, $Cu^{2+}$, $Zn^{2+}$, $Cd^{2+}$, $Sc^{3+}$, $Ti^{3+}$, $V^{3+}$, $Cr^{3+}$, $Fe^{3+}$, $Rh^{3+}$, $Ga^{3+}$, $In^{3+}$, $Ce^{4+}$, $Th^{4+}$, $Pa^{4+}$, $U^{4+}$, $Np^{4+}$, $Pu^{4+}$, $Mg^{2+}$, $Ca^{2+}$, $Sr^{2+}$, $Ba^{2+}$, $Al^{3+}$, $Y^{3+}$, $La^{3+}$, $Ag^+$, $Tl^+$, $Pb^{2+}$, $Ti^{3+}$, $Bi^{3+}$, $Sn^{2+}$, $Sn^{2+}$, or $Pd^{2+}$. In an embodiment, the silver nanoparticles as obtained in the step 164 may be centrifuged, and the excess liquid or the supernatant was filtered off to leave behind a wet powder. The wet powder may be further dried at a temperature less than 150° C., preferably 100-140° C., or 120-130° C. to form a dry powder. In an embodiment, the dry powder was further mixed into the aqueous solution to determine the presence of $Hg^{2+}$ ions.

At step 166, the method 150 includes detecting a color change, where the color change is indicative of the presence $Hg^{2+}$ in the aqueous solution. In an embodiment, the color change occurs selectively in the presence of mercury ions. In an embodiment, the color change is measured by the disappearance of the absorption band from 400 to 600 nm, preferably 450-550 nm, or 400-450 nm in the UV-vis spectrum; and the degree of the color change linearly correlates with the concentration of $Hg^{2+}$ in the aqueous solution. In an embodiment, the $Hg^{2+}$ detection limit is 0.25, preferably 0.20, or 0.15 parts per million (ppm).

EXAMPLES

The following examples describe and demonstrate the method and exemplary embodiments of the synthesis of the silver nanoparticles described herein. The examples are provided solely for the purpose of illustration and are not to be construed as limitations of the present disclosure, as many variations thereof are possible without departing from the spirit and scope of the present disclosure.

The green synthesis of AgNPs was conducted under varying conditions to evaluate the effect of different factors on the silver nanoparticles synthesis, size and shape. The effect of a silver ion concentration was examined by using 0.01, 0.02, and 0.03 M $AgNO_3$ in the AgNPs synthesis without changing any other parameter. The effect of the orange peel extract volume was studied by altering its volume (3 mL, 5 mL, 7 mL, and 10 mL) while keeping other parameters unchanged. Similarly, the effect of reaction temperature on AgNPs synthesis was examined by carrying out the synthesis at 25° C., 50° C., and 75° C. The impact of pH was studied by varying the pH of the extract in acidic (pH 3, 4, and 5) and alkaline conditions (pH 10, 11, and 12). Finally, the effect of reaction time was investigated by studying the UV-vis absorbance spectra of AgNPs produced after 2, 5, 10, 20, 40, and 80 mins of reaction time (FIGS. 2-4).

Figure 2:
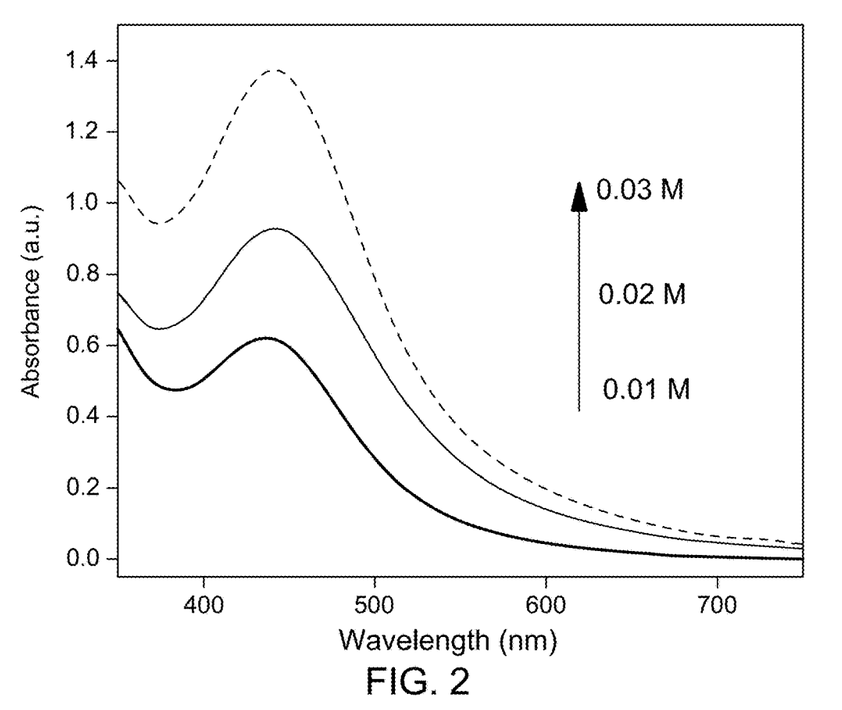
FIG. 2 is a graphical representation of an UV-vis absorbance spectra depicting the effect of concentration of silver ions on synthesis the silver nanoparticles, according to certain embodiments.

Referring to FIG. 2, a graphical representation of the UV-vis absorbance spectra depicting the effect of silver ion concentration for making the AgNPs is presented. For this purpose, various concentrations of $AgNO_3$ were prepared, namely, 0.01 M, 0.02 M, and 0.03 M, without changing any other parameter. For each concentration, the synthesis was carried out at room temperature in the presence of 5 mL of orange peel extract, which was added to the $AgNO_3$ solution without adjusting its pH. The reaction was allowed to reach completion as indicated by the golden-brown color of the resulting AgNPs colloid solution. As can be observed from the FIG. 2, the absorption intensity of AgNPs colloid solution was found to increase in intensity with increasing concentration of the silver ions from 0.01 to 0.03 M, suggesting the formation of more AgNPs with increasing concentration of silver ions. This is correlated to the Beer Lambert's Law ($A \propto C$), as the concentration of silver ions increased, the absorbance of the resulting AgNPs colloid solution increases proportionally, signifying a higher concentration of AgNPs in solution. UV-vis spectra of the resulting AgNPs showed a broad surface plasmon resonance (SPR) absorption with a maximum absorbance centered in the 410-440 nm region, particularly at 420 nm and this band increased in intensity as the concentration of $AgNO_3$ rose from 0.01 to 0.03 M, suggesting the formation of more AgNPs with increasing concentration of silver ion. The absorption band is attributable to SPR excitation of the silver nanoparticles with sizes ranging from 2 to 100 nm in aqueous medium. Very minor shifts (about 5 nm) were discernible from SPR absorption bands of AgNPs synthesized with 0.01-0.02 M concentrations of $AgNO_3$ in comparison to that of 0.03 M. Such shifts may be ascribed to the formation of smaller sized silver nanoparticles at low concentration of silver ion.

Figure 3:
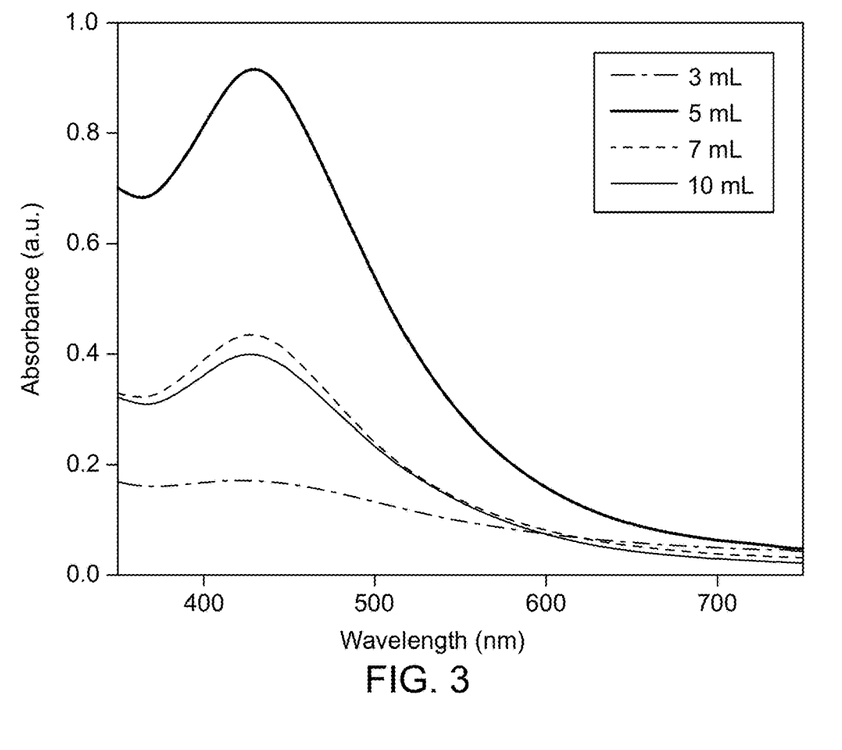
FIG. 3 is a graphical representation of the UV-vis absorbance spectra depicting the effect of orange peel extract volume on the synthesis of the silver nanoparticles, according to certain embodiments.

Referring to FIG. 3, a graphical representation of an UV-vis absorbance spectra depicting the effect of the orange peel extract volume on the synthesis of silver nanoparticles is described. The reaction conditions were as follows: $AgNO_3$ concentration: 0.01 M, temperature: room temperature; pH of extract: unadjusted natural pH; reaction time: until completed (appearance of golden brown color), without changing any other parameter. From the FIG. 3, it can be observed that there was a variation observed in the SPR absorption bands on increasing the extract volume. When 3 mL of extract was used, a somewhat flat SPR absorption was observed and the golden-brown color was not observed. However, when the volume of the extract was increased to 5 mL, a marked difference in the intensity of the absorbance was observed, suggesting the presence of sufficient amounts of natural antioxidants associated with reducing the silver ions resulting in formation of the AgNPs. This result shows that an extract volume of 5 mL is sufficient to react with 40 mL of silver(I) ion solution, a volume ratio of 1:8. It also means that the number of antioxidants present in an extract volume of 3 mL (1:13) is insufficient compared to the 1:8 ratio required to initiate reduction of silver ion such that observable color changes characteristic of complete formation of AgNPs were not visible in a reasonable amount of time. However, increasing the volume of the orange peel extract to 7 mL or 10 mL did not increase the intensity of absorption; on the contrary a decrease in in absorbance was observed. This may be ascribed to a change in volume ratio (1:6 and 1:4 instead of 1:8) diluting the resulting colloidal solution thereby preventing interaction of the silver and antioxidants. This dilution effect therefore affirms the importance of a sufficient concentration of active compounds found in the orange peel extract in order to synthesize the AgNPs.

Figure 4:
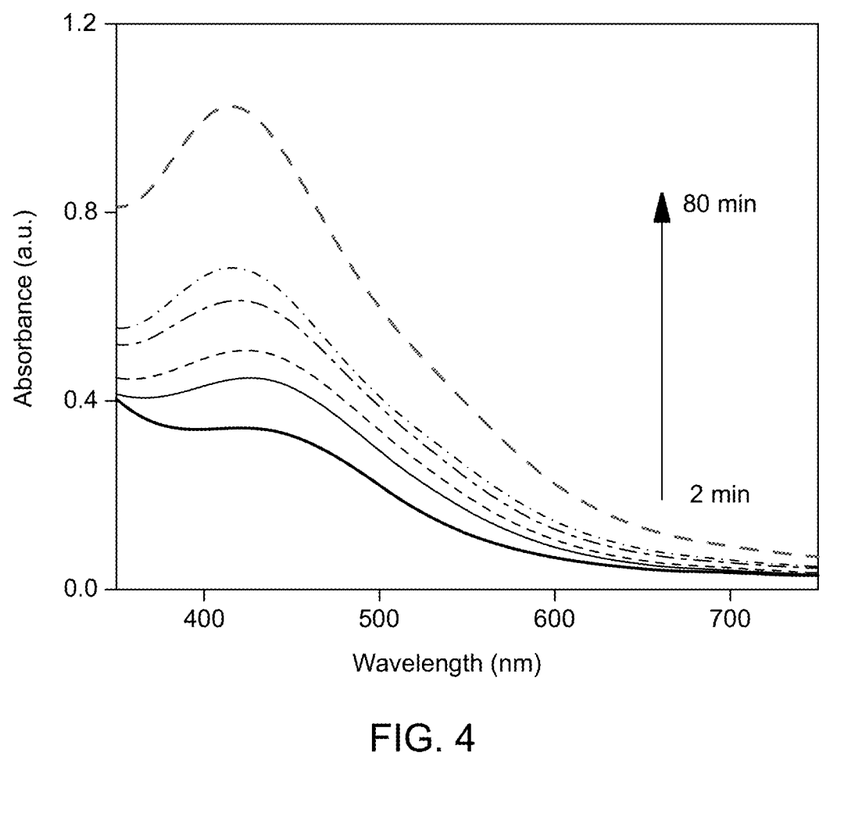
FIG. 4 is a graphical representation of the UV-vis absorbance spectra depicting the effect of time on the synthesis of the AgNPs, according to certain embodiments.

Referring to FIG. 4, a graphical representation of a UV-vis absorbance spectra depicting the effect of time on synthesis of the silver nanoparticles is described. The reaction conditions maintained for the synthesis of the AgNPs colloid solution are: $AgNO_3$ concentration: 0.01 M, volume of extract: 5 mL; temperature: room temperature; pH of extract: unadjusted natural pH. The synthesis of AgNPs was tracked with UV-vis absorbance and the spectra recorded at time intervals of 2, 5, 10, 20, 40, and 80 mins showed systematic increase in absorbance as the incubation or reaction time increased. The bands formed at 2, 5, 10, and 20 mins were within the range of 420-440 nm. The increase in absorbance with increasing incubation time might be attributed to an increase in the quantity of the silver nanoparticles, with the progression of the reaction. Those spectra taken at 40 and 80 mins showed a gradual shift below 420 nm, suggesting a steady decrease in size of the AgNPs over time.

The effect of pH on the synthesis of AgNPs was studied, and the corresponding UV-vis absorbance spectra was obtained at different pH. The pH of the orange peel extract was adjusted with dilute acid and base as required. Two separate sets of experiments were conducted, one in the acidic range (pH 3, 4, and 5) and the other in the alkaline range (pH 10, 11, and 12). It was observed that the formation of AgNPs was progressively faster as the pH becomes more alkaline. The reaction performed under alkaline pH of 12 was complete in less than 3 minutes, while the reaction performed under acidic conditions took about 15 minutes to complete. The differences in reaction times is probably due to variations in the pKa values of functional groups of the natural antioxidants such as flavonoids, and tannins that participate in the reduction of the silver ion. Alkalinity is known to induce an electrostatic repulsion force among nanoparticles, thereby, effectively preventing them from agglomerating. On the other hand, acidity confers a very high-positive charge on the hydroxyl groups of the natural antioxidants (citric acid, hesperidin, and alkaloids) responsible for reducing silver ions, thus upon the formation of the silver nanoparticles, their stability will be low such that agglomeration will eventually occur.

The synthesis of silver nanoparticles varies with temperature. The working temperature under which the synthesis of AgNPs was conducted showed significant influence on the synthesis of AgNPs. At a lower temperature (25° C.), the reaction took 7 mins to produce a color change and the SPR absorption was less intense. However, as the temperature increased to 80° C., the reduction of silver ion went faster; a change in color was noticed within 2 mins and the SPR absorption became much more pronounced. Temperature is an important factor in the synthesis of AgNPs and may accelerate the rate of the synthesis reaction by inducing rapid reduction of Ag$^+$ ions into AgNPs. This is explained by the fact that as the temperature increases, the reaction proceeds more rapidly which leads to the homogenous nucleation of silver nuclei thereby leading to the formation of small-sized silver nanoparticles.

After the study of physical parameters, a set of working conditions were selected as reaction conditions that produced good yield of AgNPs in reasonable time (4 mins) as determined from the absorbance maximum of the UV-vis absorbance spectra obtained from the study of the physical parameters (refer to FIGS. 2-4). These desired conditions were then used to synthesize the AgNPs that was used for characterization and colorimetric studies. In an embodiment, the conditions include: AgNO$_3$ concentration of 0.01M, 1:8 volume ratio of orange peel extract to the silver ion (5 mL and 40 mL, respectively), a temperature of 50° C., a pH of 10; and a reaction time of 4 mins.

Example 1: Materials Required

All chemicals and reagents were used as received without further purification. Silver nitrate, AgNO$_3$ (99.8%) was bought from Loba Chemie (India); potassium hydroxide (KOH), and sulfuric acid (H$_2$SO$_4$) were procured from Merck (Germany), and potassium bromide (KBr) was obtained from Thermo Fisher (United Kingdom; UK). The metal salts used (NaCl, CaCl$_2$, MgCl$_2$·6H$_2$O, AlCl$_3$·6H$_2$O, Cd(NO$_3$)$_2$·4H$_2$O, NiCl$_2$·6H$_2$O, and Hg(NO$_3$)·H$_2$O were all purchased from Sigma Aldrich (United States of America; USA) or Merck (Germany).

Example 2: Method of Preparation of an Orange Peel Extract

A fresh orange was purchased from a local store located within King Fahd University of Petroleum and Minerals. The orange was peeled with a clean knife and the peels were cut into small sizes (about 0.5×0.5 square centimeters (cm$^2$)) and washed thoroughly with deionized water. 10 grams (g) of the orange peels were boiled in 100 milliliters (mL) of water for 3 minutes (mins) followed by filtration. The orange peel extract obtained was further used without any further dilution for the synthesis of the silver nanoparticles.

Example 3: Method of Preparing the Silver Nanoparticles

For an orange peel-mediated synthesis of the silver nanoparticles, 40 mL of 0.01 M AgNO$_3$ was mixed with 5 mL of the orange peel extract at room temperature under constant stirring. The reaction progress was visually monitored by observing variations in color of the solution from colorless to yellow to golden-brown. An UV-vis spectrum was taken at the end once the golden-brown color has been formed to ascertain the formation of the silver nanoparticles. The synthesized AgNPs were used for characterization and colorimetric studies.

Example 4: Characterization Studies

The AgNPs were characterized to assess the functional aspects of the silver nanoparticles. The AgNPs prepared were characterized with the UV-vis spectroscopy, X-ray diffractometry (XRD), Field emission scanning electron microscopy (FESEM), and Fourier transform infrared spectroscopy (FT-IR). The UV-vis absorbance spectra of the AgNPs colloid solution formed from the synthesis was characterized on a dual beam Genesys 10S UV-Visible Spectrophotometer (Thermo Scientific) running on VISION Lite software. For XRD, FESEM, and FT-IR characterizations, AgNPs were synthesized in a large 1-liter (L) beaker (using the optimum synthesis conditions) and dried in an oven for 18 hours (h). The resulting lumps of AgNPs were carefully broken into powder and used for XRD, FT-IR, and FESEM measurements. For FESEM, a small portion of the nanoparticles was placed on aluminum foil followed by coating of the foil's surface with gold before putting the sample into the FESEM instrument. In FT-IR, AgNPs were mixed with KBr, and the mixture was pelletized. The pellets were used for FT-IR measurements. The X-ray diffraction was carried out using a Rigaku Ultima IV X-ray Diffractometer with a rated tube voltage of 60 kilovolt (kV) and 60 milliampere (mA) current running on PDXL integrated X-ray powder diffraction software. FESEM measurements were carried out with a Quattro S FESEM instrument (Thermo Scientific), while FT-IR spectra were acquired with a Nicolet 6700 FT-IR spectrophotometer (Thermo Electron Corporation), running on an OMNIC software and the resolution was set to 2.0 cm$^{-1}$.

Figure 5:
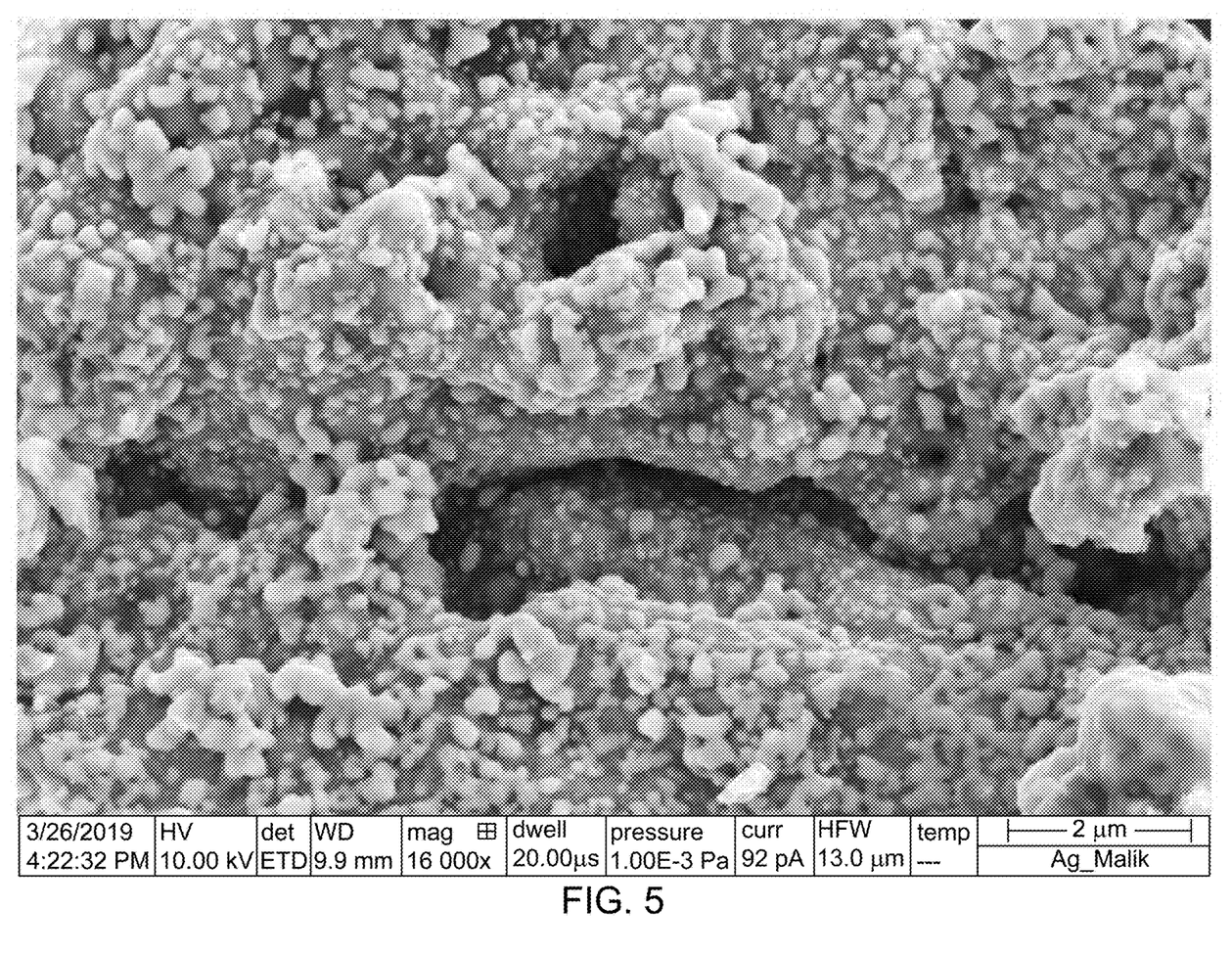
FIG. 5 is a Field Emission Scanning Electron Microscope (FESEM) image of the orange peel extract mediated synthesized AgNPs, according to certain embodiments.

Referring to FIG. 5, is a Field Emission Scanning Electron Microscope (FESEM) image of the orange peel extract mediated synthesized AgNPs. A scanning electron microscope (SEM) was used to determine the surface morphology and distributions of the AgNPs synthesized. FESEM image taken at 16,000 and 30,000 magnifications showed an array of polydisperse AgNPs. From the image it is apparent that the nanoparticles have mostly amalgamated into nanoclusters. This might have occurred because of the longer incubation period the silver nanoparticles went through, as the incubation and drying protocols took about 18 hours (h), to prepare the samples for SEM. Given that the colloidal solution of AgNPs was left for about 18 hours during the course of drying, the nanoparticles clustered together over time as the liquid was gradually evaporated and individual nanoparticles increasingly moved closer to neighboring nanoparticles, thereby forming clusters of nanoparticles (nanoclusters). The silver nanoparticles were mostly irregular in shape and their average size was about 55 nm.

The FT-IR spectrum obtained from the AgNPs shows that the AgNPs may be functionalized with biomolecules containing —$NH_2$, carbonyl and —OH groups. The broad peak at 3433 $cm^{-1}$ may be due to either O—H or N—H stretching vibrations from hydroxyl and amine groups of the extract constituents. Furthermore, the bands located at 2923 $cm^{-1}$ and 2855 $cm^{-1}$ were assigned to C—H stretching vibrations while the peak at 1629 $cm^{-1}$ is due to either amide C=O stretching (proteins) or aromatic C—C stretching (flavonoids). The twin peaks occurring at 1459 $cm^{-1}$ and 1380 $cm^{-1}$ are within the range of amide III band and were assigned to N—H bending and C—N stretching of protein structures present in the orange peel extract. These results gave an insight into the functional groups involved in the synthesis reaction and they suggest that protein molecules in the orange peel extract may be involved in the stabilization of AgNPs through amide bonds.

The XRD pattern of the AgNPs obtained from X-ray diffraction analysis displayed three intense and sharp peaks and one less defined peak. The diffraction peaks obtained at 2θ angles of 37.11°, 40.86°, 67.05°, and 79.17° correspond to the 111, 200, 220, and 311 miller indices. The observed peaks point to the high crystallinity of the silver nanoparticles and peaks arising from impurities were not detected. The narrowness of the peaks suggests a smaller sized silver nanocrystal. This is based on Scherrer's equation which states that the peak width is a major determinant of the size of nanoparticles crystallites. The XRD patterns show good similarity with two different International Center for Diffraction Data (ICDD) files; 87-0717 and 87-0718. According to the ICDD references, the orange peel-mediated AgNPs exhibit a face-centered cubic lattice structure.

Example 5: Colorimetric Experiments

All colorimetric measurements were made at room temperature. In conducting Hg (II) detection using the synthesized AgNPs, 1 mL aliquot of AgNPs colloid solution was taken and its UV-vis absorbance spectrum was recorded as blank. To establish the sensing propensity of the AgNPs for $Hg^{2+}$ ions, 4 mL of a 1 mM solution of $Hg^{2+}$ was added to 1 mL of AgNPs colloid solution and the resulting solution thoroughly mixed. Various concentrations of $Hg^{2+}$ were also similarly tested by adding of 4 mL of solutions containing different nominal concentrations of $Hg^{2+}$ ions to each 1 mL aliquot of AgNPs to determine the sensitivity of the procedure. To investigate the selectivity of the as-synthesized AgNPs in detecting $Hg^{2+}$ ions, 4 mL solutions of cations of representative metals groups; alkali ($Na^+$), alkali earth ($Ca^{2+}$, $Mg^{2+}$, $Al^{3+}$), and transition ($Ni^{2+}$, $Cd^{2+}$) of 1 mM concentration were each added to 1 mL aliquot of AgNPs under same conditions. The changes in color were visually observed and the corresponding absorbance changes were confirmed with the UV-vis spectrophotometer.

Figure 6:
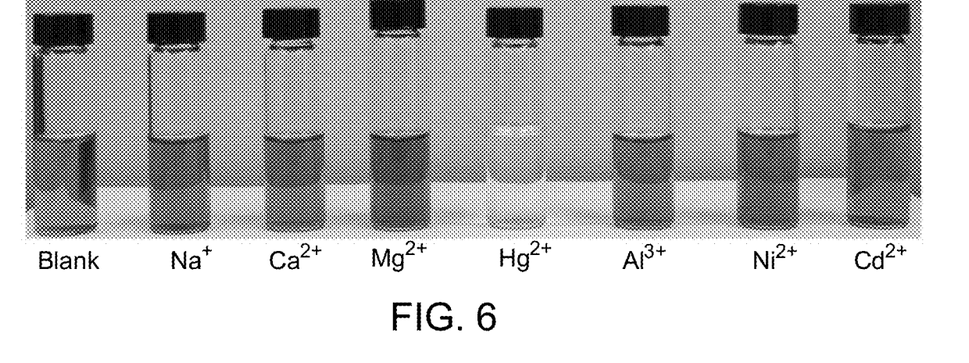
FIG. 6 is a pictorial representation showing a color change observed after adding various metal ions to the AgNPs colloid solution, according to certain embodiments.

Referring to FIG. 6, is a pictorial representation showing the color change observed after adding various metal ions to the AgNPs colloid solution. Only $Hg^{2+}$ solution gave a complete disappearance of the golden-brown color of the colloid solution. Other metal ions did not show such a dramatic change in color. The strong affinity between silver and mercury leads to the deposition of mercury onto the silver surfaces thereby leading to the formation of silver-mercury amalgam, which is responsible for the significant decrease in SPR absorption intensity and of course the disappearance of the golden-brown color of AgNPs colloidal solution as shown in FIG. 6. Therefore, the observed dramatic change in color of AgNPs colloid solution upon addition of $Hg^{2+}$ stems from the formation of silver-mercury amalgam. Mercury has a strong propensity to form amalgams or alloys with other metals at low temperatures (below 100° C.). In the case of the AgNPs this amalgamation is made possible by the nanoscale size of the silver and the strong affinity between silver and mercury. The colorimetric detection of mercury (II) ions using the synthesized AgNPs revealed a marked difference in UV-vis absorbance spectra and visual color of the colloid solution after the addition of aqueous solution of $Hg^{2+}$ ions. These ions caused a sudden change in the color of AgNPs colloid solution from golden-brown to light brown and finally to colorless within 3 mins of adding the $Hg^{2+}$ solution. However, when other cations ($Na^{2+}$, $Ca^{2+}$, $Mg^{2+}$, $Al^{3+}$, $Cd^{2+}$, $Ni^{2+}$) were added to the AgNPs colloid solution, there was no such dramatic change in color and there was no disappearance of the SPR absorption band of the colloid solution. This indicates that the observed changes are specific to a peculiar interaction between mercury and nanoscale silver. Thus, the AgNPs are selective toward $Hg^{2+}$ ions and show no dramatic changes toward other cations tested.

Figure 7:
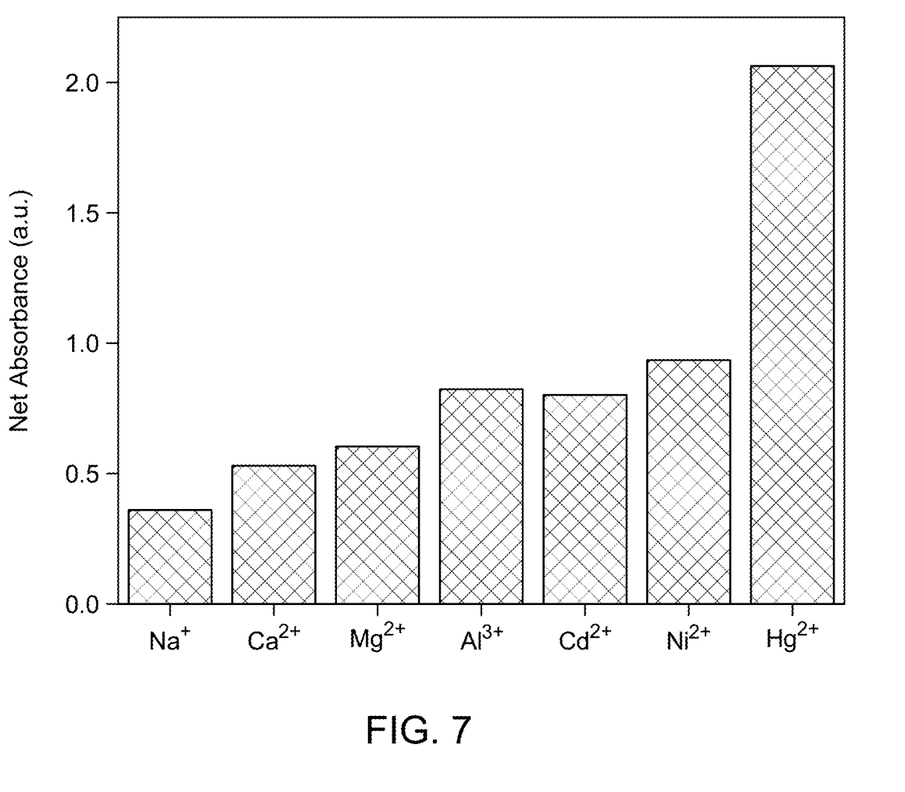
FIG. 7 is a graphical representation of net absorbance recorded for different metals, according to certain embodiments.

Referring to FIG. 7, is a graphical representation of net absorbance recorded for different metals. $Hg^{2+}$ gave the highest net absorbance. The dramatic visual color change observed on adding aqueous solution of $Hg^{2+}$ ions to the AgNPs colloid solution, which also showed up as a complete disappearance of the SPR absorption band was quantified. The net absorbance was plotted for all the metal ions tested, including $Hg^{2+}$ ions. It shows that the largest net absorbance was observed for $Hg^{2+}$ ions, there was a complete loss of SPR absorption band with the addition of $Hg^{2+}$ ion, which led to a flat absorbance response.

Figure 8:
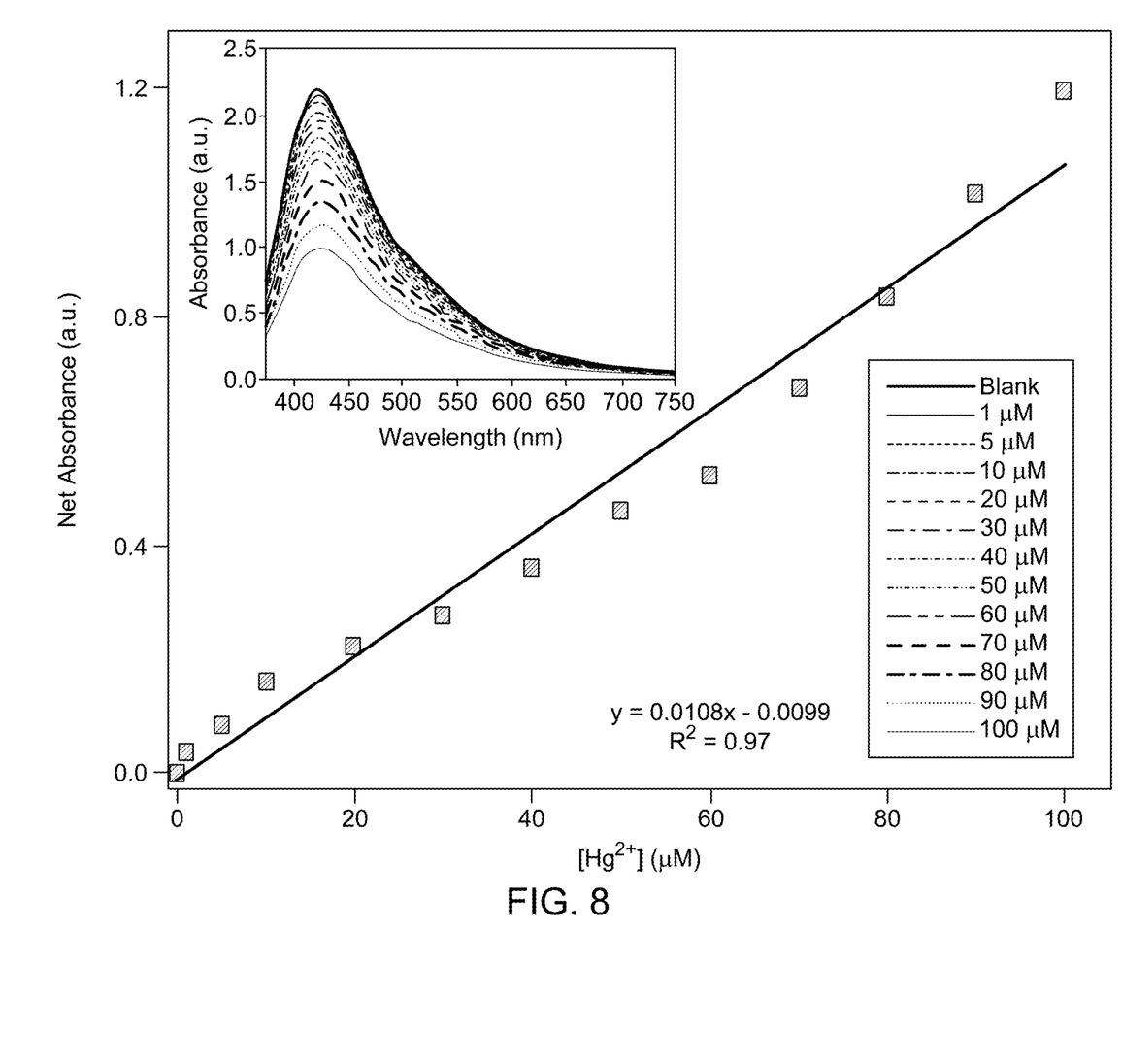
FIG. 8 is a concentration-dependent plot of net absorbance versus $Hg^{2+}$ concentration, with an inset of the UV-vis absorption spectra of the AgNPs colloid solution corresponding concentrations of $Hg^{2+}$ according to certain embodiments.

In establishing the sensitivity of synthesized AgNPs toward $Hg^{2+}$ ion, the concentration of this cation was varied from 1 to 100 μM as shown in FIG. 8. It was observed that with every increase in the concentration of $Hg^{2+}$, the UV-vis absorbance spectra showed progressive loss of absorbance intensity and the color intensity of the solution visually diminished as well. The variation in concentration was found to produce a linear response within the range of 1-100 μM tested (FIG. 8), with a limit of detection (LOD) of $1.25 \times 10^{-6}$ M (0.25 parts per million (ppm)).

Figure 9:
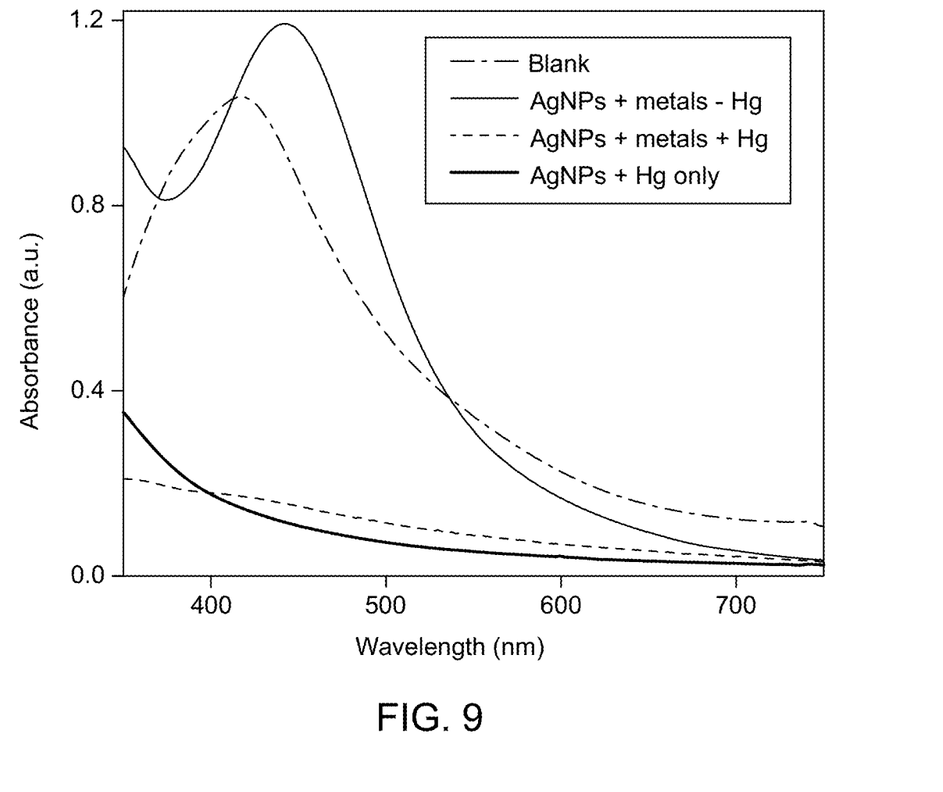
FIG. 9 is a graphical representation of the UV-vis absorbance spectra of AgNPs colloid solution depicting the effect of other metal ions on colorimetric detection of $Hg^{2+}$, according to certain embodiments.

The selectivity of the AgNPs sensor for $Hg^{2+}$ ion in the presence of other metal ions was studied, and the results of this study are presented in FIG. 9. It also tested the robustness of this colorimetric $Hg^{2+}$ detection method to possible interferences in samples that may contain various metals in a single medium. For this purpose, a complex mixture of different metal ions was prepared to test the possibility of interferences from other metal ions. Equal volumes (1 mL) each of 1 mM solutions of $Na^{2+}$, $Ca^{2+}$, $Mg^{2+}$, $Al^{3+}$, $Cd^{2+}$, $Ni^{2+}$ and $Hg^{2+}$ were mixed and added to 1 mL of AgNPs colloid solution. Another solution was made in which all these metal ions were mixed except for $Hg^{2+}$ and added to 1 mL of AgNPs colloid solution. A third solution containing only $Hg^{2+}$ was also prepared and similarly added to AgNPs colloid solution. FIG. 9 presents the corresponding UV-vis absorbance spectra for all the three solutions. It is clear from the figure that the presence of other metals did not present significant interference on the ability of AgNPs to selectively detect $Hg^{2+}$ ions. Thus, the colorimetric detection of $Hg^{2+}$ by AgNPs suffers little or no interference from other metal ions. For the solution containing all the metal ions except $Hg^{2+}$ the SPR absorption band was intact. However, inclusion of $Hg^{2+}$ in the mixture led to the disappearance of the band.

A visual colorimetric detection method with drinking water was performed, and initial colorimetric test revealed that the water sample did not contain detectable amounts of mercury. So, the water sample was spiked with 4 mL of 20, 40, 60, and 80 µM $Hg^{2+}$. The recorded absorbance versus concentration is linear. This shows that the orange peel extract mediated synthesized AgNPs might be deployed for colorimetric test for mercury ions in drinking water.

The present disclosure provides a method of green synthesis of the silver nanoparticles (AgNPs) using the orange (*Citrus sinensis*) peel extract. The use of the orange peel extract as the reducing agent in the synthesis of AgNPs circumvents the drawbacks associated with conventionally used reducing agents such as toxicity, and hazardous solvents. Another advantage of the method of the present disclosure is that the method is performed in a single pot, and avoids the need of multi-step procedures, thereby saving substantial amount of reaction time, and its associated costs. Yet another advantage of the method of the present disclosure is the method is amenable to scale up, and high colloidal stability due to the presence of natural products (orange peel extract) that serve as reducing and capping agents. Also, the nanosensor of the present disclosure is highly selective towards $Hg^{2+}$, at low concentrations, with detection rates less than 3 minutes. Also, the use of orange peel extract as a reducing agent is a way of putting waste materials to use and it is consistent with green chemistry and environmental sustainability goals. The unique optical properties of the silver nanomaterials product coupled with their stability and selectivity provides a viable opportunity for their use as simple visual colorimetric mercury (II) ion sensors.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of making silver nanoparticles, comprising:
preparing an orange peel extract by:
cutting a portion of an orange peel into pieces having a surface area of 0.01-0.4 $cm^2$;
washing the cut orange peel pieces with deionized water to form a washed orange peel;
forming a mixture of 5-20 weight percentage (wt %) washed orange peel and 80-95 wt % deionized water, based on the total weight of the washed orange peel and deionized water;
boiling the mixture in water for at least 3 minutes to form an extract solution;
separating the extract solution from the orange peel to obtain the orange peel extract; then
forming a synthesis mixture of at least one silver salt and the orange peel extract, wherein the silver salt is at a concentration of 0.01-0.03 Molarity (M) in solution and the orange peel extract is present in a 1:5-10 volume ratio of orange peel extract to silver salt solution; and
reacting the silver salt and the orange peel extract to form the silver nanoparticles by heating the synthesis mixture to 40-60 degrees centigrade (° C.) and adjusting the mixture pH to 8-10 while stirring thereby forming a colloidal solution of the silver nanoparticles;
wherein the reacting of the silver salt and the orange peel extract to form the silver nanoparticles occurs in less than 1 minute,
wherein the silver nanoparticles are amorphous, and
wherein the silver nanoparticles have a mean particle size of 25-75 nm.

2. The method as in claim 1, further comprising:
confirming the formation of the silver nanoparticles by the appearance of an absorption band from 410 to 440 nanometers (nm) in an ultraviolet-visible (UV-vis) absorbance spectrum.

3. The method as in claim 1, wherein:
the silver salt is selected from the group consisting of a silver halide, a silver sulfate, and a silver nitrate; and
the orange peel extract is from the *Citrus sinensis* species.

4. The method of claim 1, further comprising:
after the boiling, reacting the extract solution with an oxidizing solution in an amount sufficient to at least partially oxidize or carboxylate one or more orange peel compounds present in the extract solution.

5. A method of detecting mercury ions in an aqueous solution, comprising:
preparing an orange peel extract by:
cutting a portion of an orange peel into pieces having a surface area of 0.01-0.4 $cm^2$;
washing the cut orange peel pieces with deionized water to form a washed orange peel;
forming a mixture of 5-20 wt % washed orange peel and 80-95 wt % deionized water, based on the total weight of the washed orange peel and deionized water;
boiling the mixture in water for at least 3 mins to form an extract solution;
filtering the extract solution from the peel to obtain the orange peel extract; then
forming a synthesis mixture of at least one silver salt and the orange peel extract, wherein
the silver salt is at a concentration of 0.01-0.03 M in solution and the orange peel extract is present in a 1:5-10 volume ratio of orange peel extract to silver salt solution;
reacting the silver salt and the orange peel extract to form the silver nanoparticles by heating the synthesis mixture to 40-60° C. and adjusting the mixture pH to 8-10 while stirring thereby forming a colloidal solution of the silver nanoparticles;
wherein the reacting of the silver salt and the orange peel extract to form the silver nanoparticles occurs in less than 1 minute;
mixing the silver nanoparticles with the aqueous solution; and
detecting a color change following the mixing that indicates a presence of $Hg^{2+}$ in the aqueous solution by UV-Vis spectroscopy,
wherein the silver nanoparticles are amorphous, and
wherein the silver nanoparticles have a mean particle size of 25-75 nm.

6. The method as in claim 5, further comprising:
confirming the formation of the silver nanoparticles by an appearance of an absorption band from 410 to 440 nm in an UV-vis absorbance spectrum.

7. The method of claim 6, wherein:
the color change is monitored by a disappearance of the absorption band from 410 to 440 nm in the UV-vis absorbance spectrum.

8. The method of claim 6, wherein:
the color change is measured by a disappearance of the absorption band from 410 to 440 nm in the UV-vis spectrum; and
a degree of the color change linearly correlates with a concentration of $Hg^{2+}$ in the aqueous solution.

9. The method as in claim 5 wherein:
the silver salt is selected from the group consisting of a silver halide, a silver sulfate, and a silver nitrate; and
the orange peel extract is from the *Citrus sinensis* species.

10. The method of claim 5, further comprising:
centrifuging the colloidal solution of the silver nanoparticles and filtering off excess solution to form a wet powder;
drying the wet powder at a temperature less than 150° C. to form a dry powder;
mixing with the dry powder with the aqueous solution.

11. The method of claim 5, further comprising:
quantifying the color change to determine a concentration of $Hg^{2+}$ in the aqueous solution.

12. The method of claim 5, wherein:
a $Hg^{2+}$ detection limit is 0.25 ppm.

13. The method of claim 5, wherein:
the aqueous solution further comprises at least one metal cation selected from
the group consisting of $Ca^{2+}$, $Mg^{2+}$, $Al^{3+}$, $Ni^{2+}$, $Cd^{2+}$, and $Na^+$; and
the color change occurs selectively in the presence of $Hg^{2+}$.

* * * * *